United States Patent
Sung et al.

(10) Patent No.: US 9,057,433 B2
(45) Date of Patent: Jun. 16, 2015

(54) SHIFT CONTROL METHOD FOR AUTOMATED MANUAL TRANSMISSION IN A HYBRID VEHICLE

(75) Inventors: Byung Jun Sung, Gyeonggi-do (KR); Sang Pil Jang, Seoul (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 13/523,026

(22) Filed: Jun. 14, 2012

(65) Prior Publication Data

US 2013/0090794 A1    Apr. 11, 2013

(30) Foreign Application Priority Data

Oct. 10, 2011 (KR) .......................... 10-2011-0102889

(51) Int. Cl.

| | |
|---|---|
| *B60W 20/00* | (2006.01) |
| *B60W 30/19* | (2012.01) |
| *B60W 10/06* | (2006.01) |
| *B60W 10/08* | (2006.01) |
| *B60W 10/10* | (2012.01) |
| *F16H 61/04* | (2006.01) |
| *B60W 10/11* | (2012.01) |
| *F16H 63/50* | (2006.01) |

(52) U.S. Cl.
CPC ........... *F16H 61/0403* (2013.01); *B60W 10/08* (2013.01); *B60W 10/11* (2013.01); *B60W 30/19* (2013.01); *B60W 2710/083* (2013.01); *B60W 2710/1011* (2013.01); *B60Y 2400/71* (2013.01); *B60W 20/30* (2013.01); *B60Y 2300/184* (2013.01); *F16H 63/502* (2013.01); *B60Y 2300/186* (2013.01)

(58) Field of Classification Search
CPC ..... B60W 20/00; B60W 10/06; B60W 30/19; B60W 10/08; B60W 10/10; B60W 10/00
USPC .............. 701/22, 67, 101, 51–64; 180/65.21, 180/292, 293
See application file for complete search history.

(56) References Cited

U.S. PATENT DOCUMENTS

| | | | |
|---|---|---|---|
| 2002/0024306 A1* | 2/2002 | Imai et al. ....................... | 318/34 |
| 2010/0262344 A1* | 10/2010 | Fujii et al. ....................... | 701/55 |
| 2011/0098895 A1* | 4/2011 | Marcigliano et al. ........... | 701/54 |

(Continued)

FOREIGN PATENT DOCUMENTS

| | | | |
|---|---|---|---|
| EP | 1760297 A2 * | 7/2007 | |
| JP | 2002-031225 A | 1/2002 | |
| JP | 2007-118719 A | 5/2007 | |
| JP | 2007-118722 A | 5/2007 | |

(Continued)

OTHER PUBLICATIONS

Office Action dated Jan. 30, 2013 in connection with corresponding Korean application No. 10-2011-0102889.

*Primary Examiner* — Calvin Cheung
*Assistant Examiner* — Martin Weeks
(74) *Attorney, Agent, or Firm* — Mintz Levin Cohn Ferris Glovsky and Popeo, P.C.; Peter F. Corless

(57) ABSTRACT

Disclosed is a method for providing a smooth and stable synchronization operation of a transmission achieved in spite of the sudden change of a vehicle speed in the automated manual transmission (AMT) hybrid vehicle that suppresses a collapse of the synchronization by generating a torque by a motor connected to an input shaft in consideration of changes in inertia of the motor and a control target rotational speed during shifting.

3 Claims, 3 Drawing Sheets

(56) References Cited

U.S. PATENT DOCUMENTS

2011/0306463 A1* 12/2011 Tamba et al. ................. 477/5
2011/0313602 A1* 12/2011 Hirata et al. ................. 701/22

FOREIGN PATENT DOCUMENTS

| KR | 10-0980966 B1 | 9/2010 |
| KR | 10-0999234 B1 | 12/2010 |

* cited by examiner

SHIFT CONTROL METHOD FOR AUTOMATED MANUAL TRANSMISSION IN A HYBRID VEHICLE

CROSS-REFERENCE TO RELATED APPLICATION

This application claims under 35 U.S.C. §119(a) the benefit of Korean Patent Application No. 10-2011-0102889 filed on Oct. 10, 2011 the entire contents of which are incorporated herein by reference.

BACKGROUND (a) Technical Field

The present invention relates to a shift control method for an automated manual transmission (AMT) in a hybrid vehicle, and more particularly, to a technology that improves gear engagement at the time of shifting a hybrid vehicle mounted with an AMT.

(b) Background Art

More recently, AMTs have been increasingly used to increase fuel efficiency, and improve power performance, and driver convenience in both hybrid and none hybrid vehicles. An AMT does not change gears automatically, but rather facilitates manual gear changes without the use of a clutch pedal. An AMT uses electronic sensors, pneumatics, processors and actuators to execute gear shifts on the command of the driver or by a computer. This removes the need for a clutch pedal which the driver otherwise needs to depress before making a gear change in a conventional manual transmission. The clutch itself on the other hand is actuated by electronic equipment which can synchronize the timing and torque required to make gear shifts quick and smooth.

Since a conventional automatic transmission, is equipped with a torque converter, the "drivability" of the vehicle is relatively high, but power transmission efficiency is quite low, and as a result, the fuel efficiency is low as well. On the other hand, an AMT has relatively small power loss, but the drivability is slightly lower than the conventional automatic transmission since the power transmission may be interrupted during gear changes.

Therefore, reducing a period of time that power is interrupted by shortening the shift time is of significant importance in designing an AMT. Further, since gears are disengaged and engaged during gear transgression, it is important to facilitate the disengagement and engagement of the gears accordingly for if the gear engagement fails, shifting and driving the vehicle becomes impossible In particular, in the hybrid AMT vehicle, since a motor is connected together with a transmission input shaft, synchronization is difficult via only a synchronizer without the motor. Therefore, the rotational speed of the input shaft is increased close to the synchronization rotational speed by the motor and thereafter, synchronization is achieved by the synchronizer within a small speed difference range.

FIG. 1 shows a situation in which a hybrid AMT vehicle fails to engage in the proper gear during shifting on an uphill road and shows a graph corresponding to the engine speed and the transmission input shaft speed in addition to a graph of the motor torque according to the temporal change. Referring to the graphs of FIG. 1, for synchronization after disengaging a clutch, control following a motor speed is performed with a synchronization revolutions per minute (RPM) of a next target gear stage and thereafter, the motor torque is removed and the gear engagement is attempted.

However, in this case, as a vehicle speed is reduced on the uphill road, the speed of an output shaft is sharply reduced as well, and as a result, a control target rotational speed of an input shaft for synchronization with the speed of the output shaft is also sharply reduced. Since the inertia of the motor is still relatively larger than a typical disk clutch in the conventional art, the frictional force of the synchronizer can not bear the inertia in spite of a small speed difference of approximately 50 RPMs. Thus, synchronization is almost achieved during initial synchronization, but as time elapses, the gear engagement finally fails due to a synchronization collapse phenomenon in which the difference between the control target rotational speed of the input shaft and the input shaft speed is widened.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention relates to a shift control method for an AMT hybrid vehicle that achieves a smooth and stable synchronization operation of a transmission in spite of the sudden change of a vehicle speed in the AMT hybrid vehicle to prevent gear engagement failure, improve drivability by minimizing a power interruption through rapid gear engagement, and improve the durability of the transmission.

In one aspect, the present invention provides a shift control method for an AMT hybrid vehicle, including an active synchronization holding step. The active synchronization holding step suppresses the collapse of the synchronization and is performed by generating a torque by a motor connected to an input shaft in consideration of the change in inertia of the motor and a control target rotational speed during in shifting.

In another aspect, the present invention provides a shift control method for an AMT hybrid vehicle, including: a start condition judging step of judging whether shifting has started and synchronization has been achieved and thereafter, whether gear engagement has begun; a torque calculating step of acquiring a synchro load torque by multiplying a variation amount of a control target rotational speed of an input shaft by an inertial moment of a motor; a synchro load judging step of judging whether the synchro load torque is 0; an active synchronization holding step of controlling the motor to generate a torque equivalent to the synchro load torque when the synchro load torque is not 0; and a cancellation step of restoring the torque of the motor to an original state when the gear engagement is completed.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
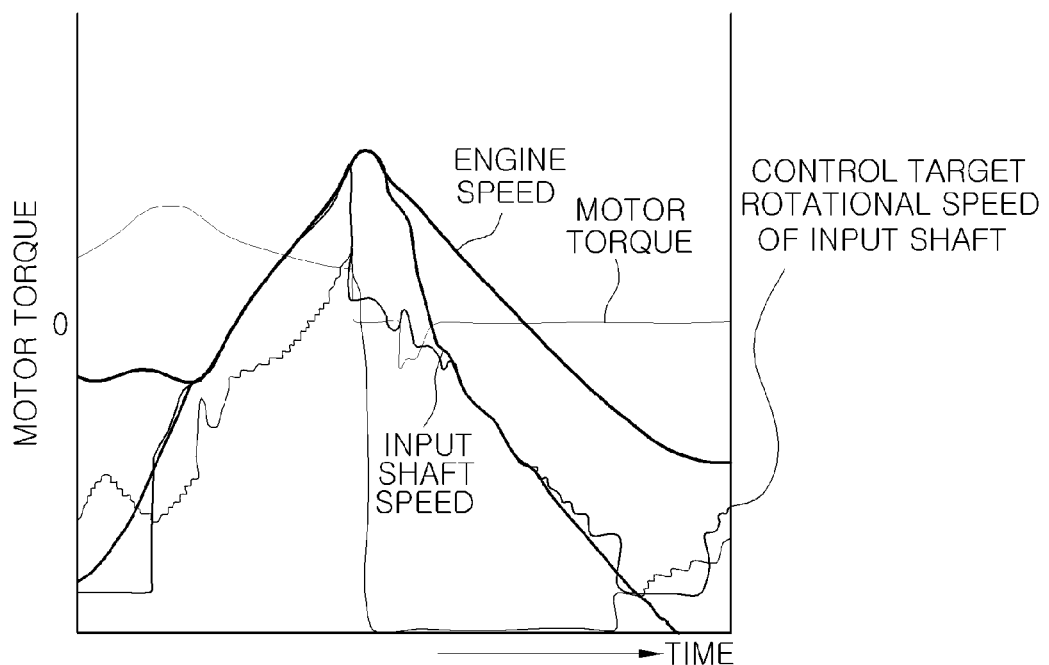
FIG. 1 is a graph showing a situation where a hybrid AMT vehicle in the conventional art fails to engage a gear while traveling uphill during shifting.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, the below described method may be executed by one or more controllers or processors installed within the vehicle with are configured to execute the steps and processes described below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
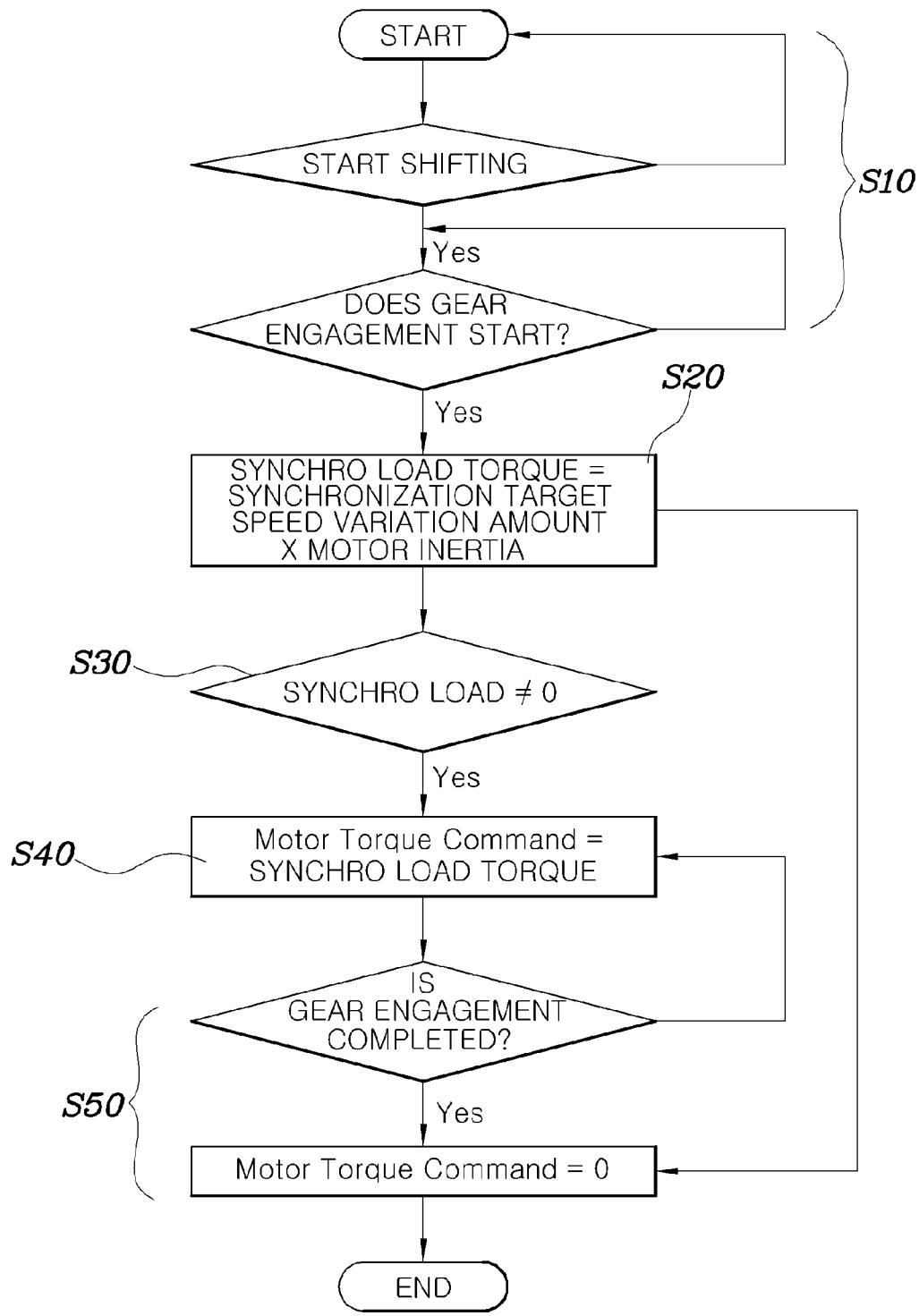
FIG. 2 is a flowchart showing a shift control method for an AMT hybrid vehicle according to an exemplary embodiment of the present invention.

Referring to FIG. 2, a shift control method for an AMT hybrid vehicle according to an exemplary embodiment of the present invention includes a start condition judging step to (S10) of determining whether shifting has started and synchronization has been achieved and thereafter, whether gear engagement has begun. In response to determining that gear engagement has begun, a torque calculating step (S20) is initiated. In torque calculating step, a synchro load torque is acquired by multiplying a variation amount of a control target rotational speed of an input shaft by an inertial moment of a motor. Then a synchro load judging step (S30) determines whether the synchro load torque is 0. When the synchro load torque is not 0, an active synchronization holding step (S40) controls the motor to generate a torque equivalent to the synchro load torque. Finally, a cancellation step (S50) restores the torque of the motor to its original state when the gear engagement has completed.

That is, during the shifting, even after the synchronization is first achieved to start the gear engagement, the synchronization state may still be difficult to maintain with only a synchronizer due to the sudden change of a vehicle speed. Thus, the active synchronization holding step (S40) suppresses the collapse of the synchronization by generating a torque with a motor in consideration of the changes of the inertia of a motor connected to an input shaft and a control target rotational speed thereby securing a stable synchronization state and facilitate a smooth shifting operation.

Furthermore, the active synchronization holding step (S40) is performed when the synchro load torque acquired by multiplying the variation amount of the control target rotational speed of the input shaft by the inertial moment of the motor is not 0 after the gear engagement has begun at a target shift stage. That is, when the synchro load torque is 0, the inertial moment of the motor is not 0, and as a result, the variation amount of the control target rotational speed of the input shaft is 0. Consequently, the vehicle speed is not significantly changed during shifting. In this case, the torque does not need to be generated with the motor in order to maintain the synchronization state.

Of course, in the active synchronization holding step (S40), the torque generated with the motor is the synchro load torque. That is, the synchro load torque acquired by multiplying the variation amount of the control target rotational speed of the input shaft by the inertial moment of the motor is calculated to be allocated to a torque command of the motor.

The active synchronization holding step (S40) starts after the gear engagement has begun at the target shift stage and when the gear engagement is completed, the active synchronization holding step (S40) is terminated. Therefore, the above method which is executed by a controller or processor in the vehicle determines whether the gear engagement has completed once the torque has been generated by the motor in the active synchronization holding step (S40) and when the gear engagement has completed, the active synchronization holding step (S40) is terminated by restoring the torque of the motor to its original state.

Herein, in restoring the torque of the motor to the original state, the torque of the general torque is typically set to 0, but this torque is not particularly limited thereto and the torque additionally generated from the motor is prevented from being generated by the active synchronization holding step (S40).

Figure 3:
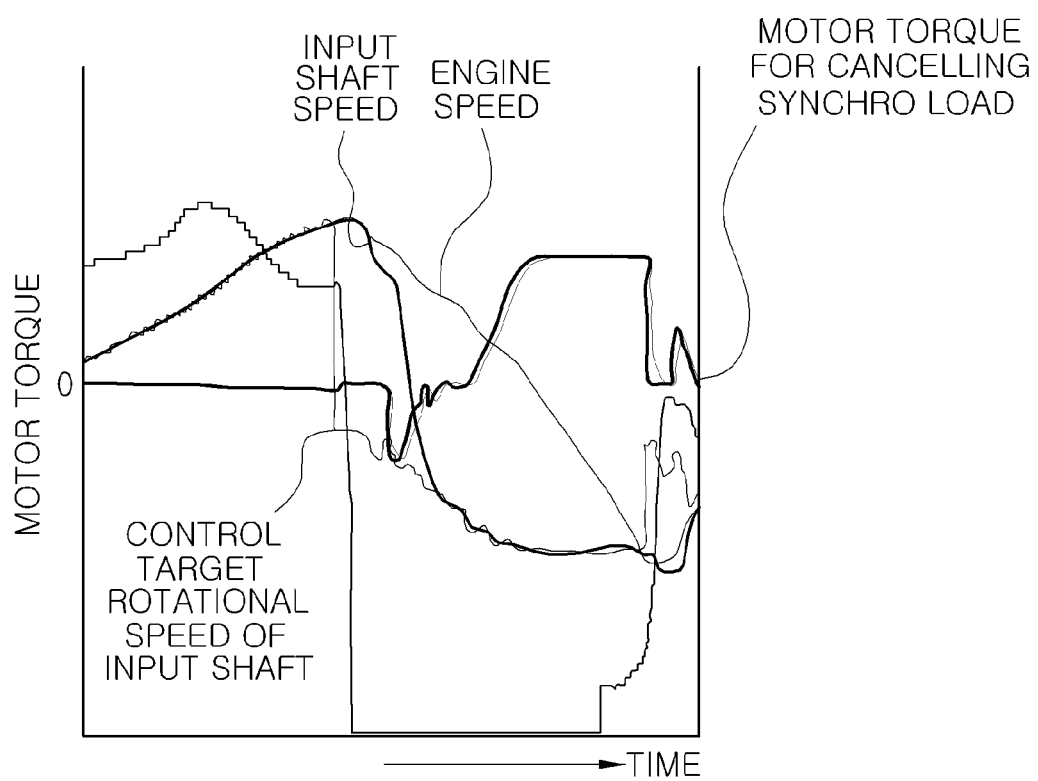
FIG. 3 is a graph showing a situation where shifting is achieved by the shift control method for an AMT hybrid vehicle according to the exemplary embodiment of the present invention.

Referring to FIG. 3, the shift first starts to perform control following a motor speed at a synchronization RPMs of a next target gear stage by the motor like in the conventional art and thereafter, a motor torque for cancelling/suppressing a load acting on the synchronizer is generated by performing the active synchronization step (S40).

As can be seen from FIG. 3, the stable synchronization state is secured and maintained in the illustrative embodiment of present invention by performing the active synchronization holding step (S40) to achieve a smooth, rapid, and stable gear engagement at the target shift stage. Therefore, the drivability of the vehicle is improved by shortening a torque interruption time of the vehicle through rapid shift completion. Furthermore, the durability of the synchronizer and the merchantability of the vehicle can be improved by securing stable shifting quality.

Thus, according to the exemplary embodiment of the present invention, a smooth and stable synchronization operation of a transmission is achieved in spite of the sudden change of a vehicle speed in the AMT hybrid vehicle to prevent gear engagement from failing, improve drivability by minimizing a power interruption due to rapid gear engagement, and improve the durability of the transmission.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A shift control method for an automated manual transmission (AMT) hybrid vehicle, comprising:
   suppressing, by a controller, a collapse of the synchronization by generating a torque by a motor connected to an input shaft based on a synchronization load torque calculated by multiplying a variation amount of a control target rotational speed of the input shaft by an inertial moment of the motor,
   wherein suppressing is performed when the synchronization load torque acquired by multiplying the variation amount of the control target rotational speed of the input shaft by the inertial moment of the motor is not 0 after gear engagement has begun at a target shift stage, and
   wherein suppressing initiates after gear engagement has begun at the target shift stage and when the gear engagement has completed suppressing is terminated.

2. A shift control method for an automated manual transmission (AMT) hybrid vehicle, comprising:
   determining, by a controller, whether shifting has begun and synchronization has been achieved and thereafter, whether gear engagement has begun;
   in response to determining that gear engagement has begun, acquiring, by the controller, a synchronization load torque by multiplying a variation amount of a control target rotational speed of an input shaft by an inertial moment of a motor;
   determining, by the controller, whether the synchronization load torque is 0;
   controlling, by the controller, the motor to generate a torque equivalent to the synchronization load torque when the synchronization load torque is not 0 to suppress a collapse of the synchronization; and
   restoring, by the controller, the torque of the motor to an original state when the gear engagement is completed.

3. A non-transitory computer readable medium containing program instructions executed by a processor or controller, the computer readable medium comprising:
   program instructions that determine whether shifting has begun and synchronization has been achieved and thereafter, whether gear engagement has begun;
   program instructions that in response to determining that gear engagement has begun, acquire a synchronization load torque by multiplying a variation amount of a control target rotational speed of an input shaft by an inertial moment of a motor;
   program instructions that determine whether the synchronization load torque is 0;
   program instructions that control the motor to generate a torque equivalent to the synchronization load torque when the synchronization load torque is not 0 to suppress a collapse of the synchronization; and
   program instructions that restore the torque of the motor to an original state when the gear engagement is completed.

* * * * *